May 16, 1967 W. A. SCHAICH 3,319,291
APPARATUS FOR BLOW MOLDING HOLLOW PLASTIC
CONTAINERS WITH OFFSET FINISH
Filed Dec. 16, 1964 4 Sheets-Sheet 2
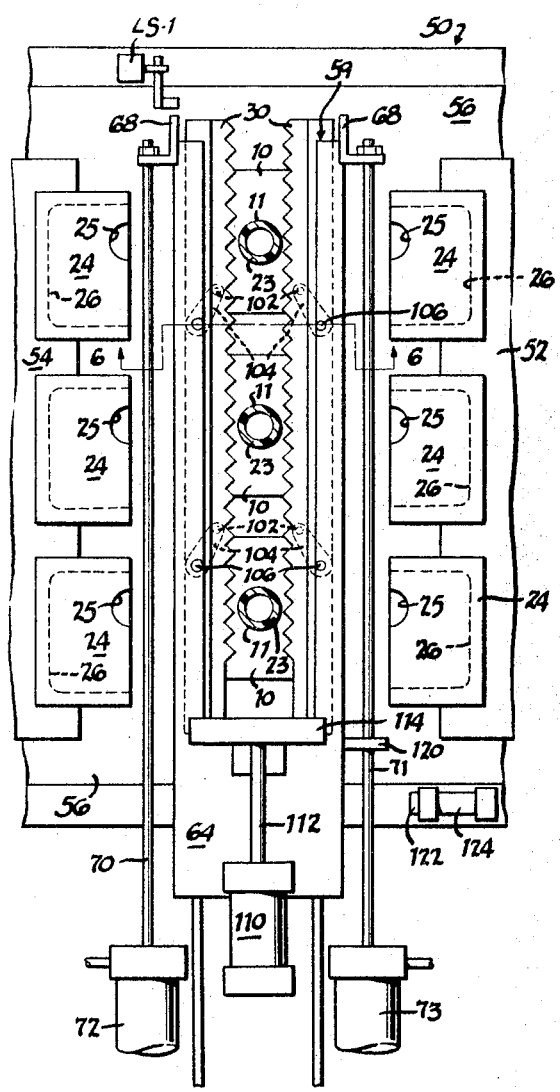
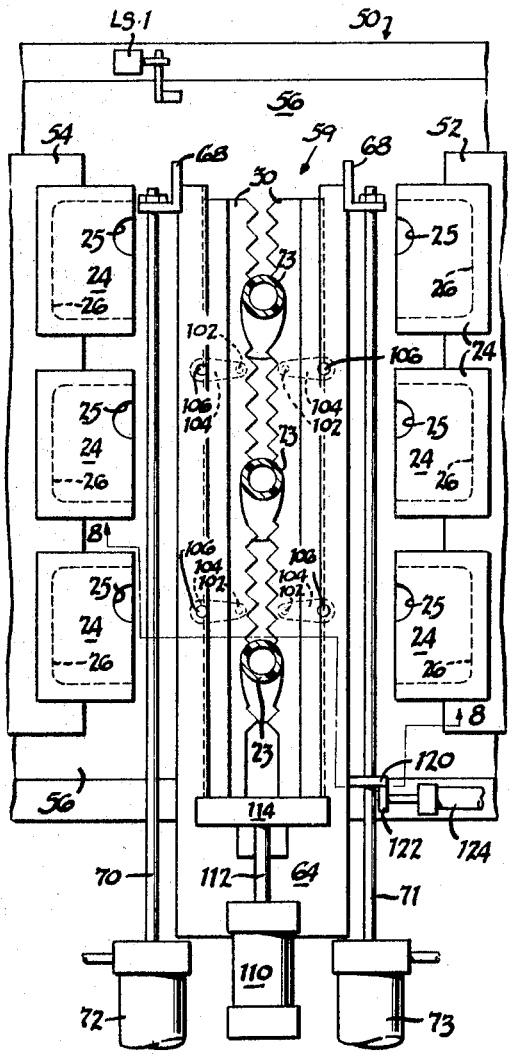
INVENTOR
WILBUR A. SCHAICH
BY
ATTORNEYS INVENTOR
WILBUR A. SCHAICH
BY Spencer L Blaylock Jr
W. A. Schaich
ATTORNEYS

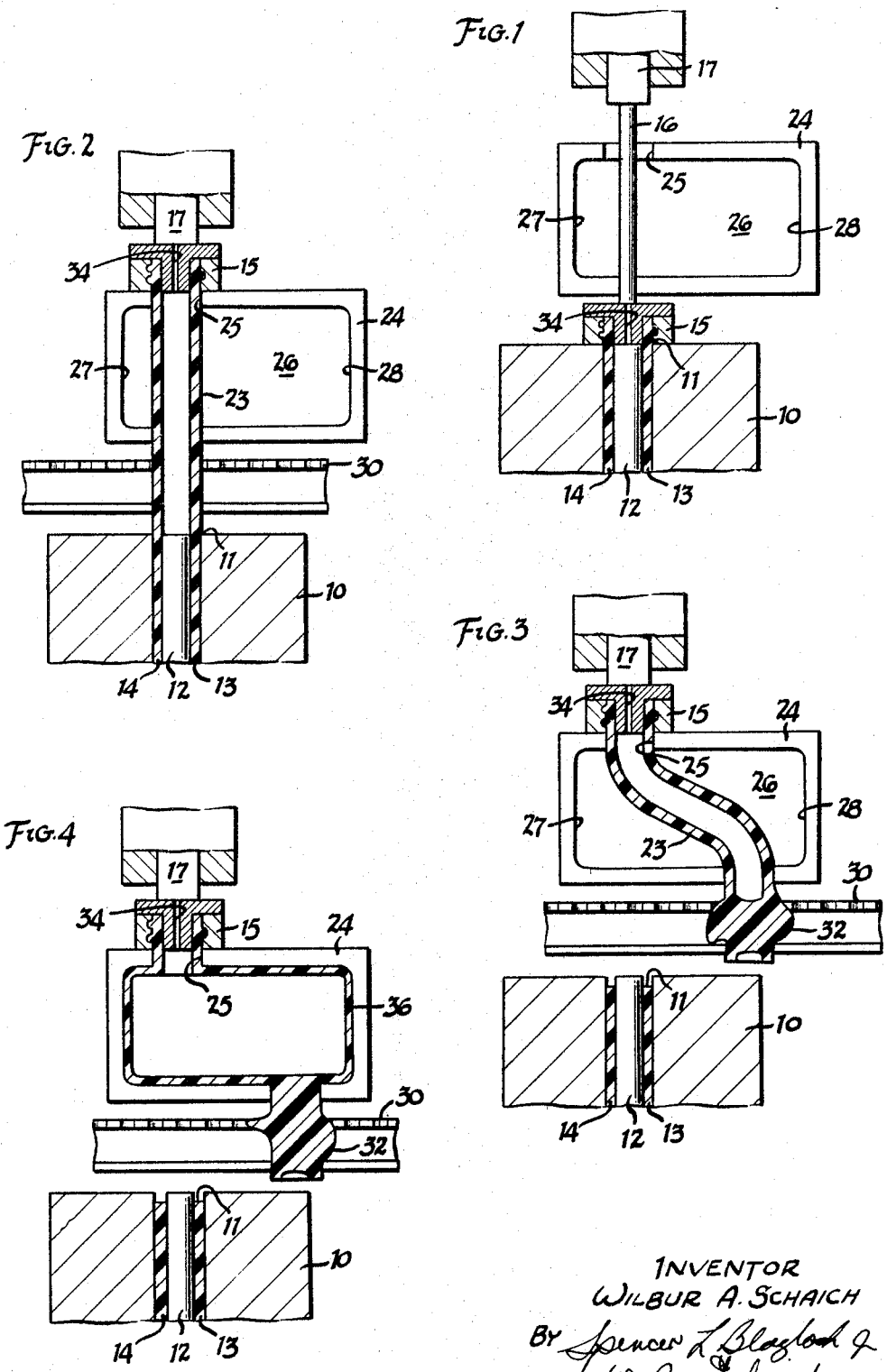

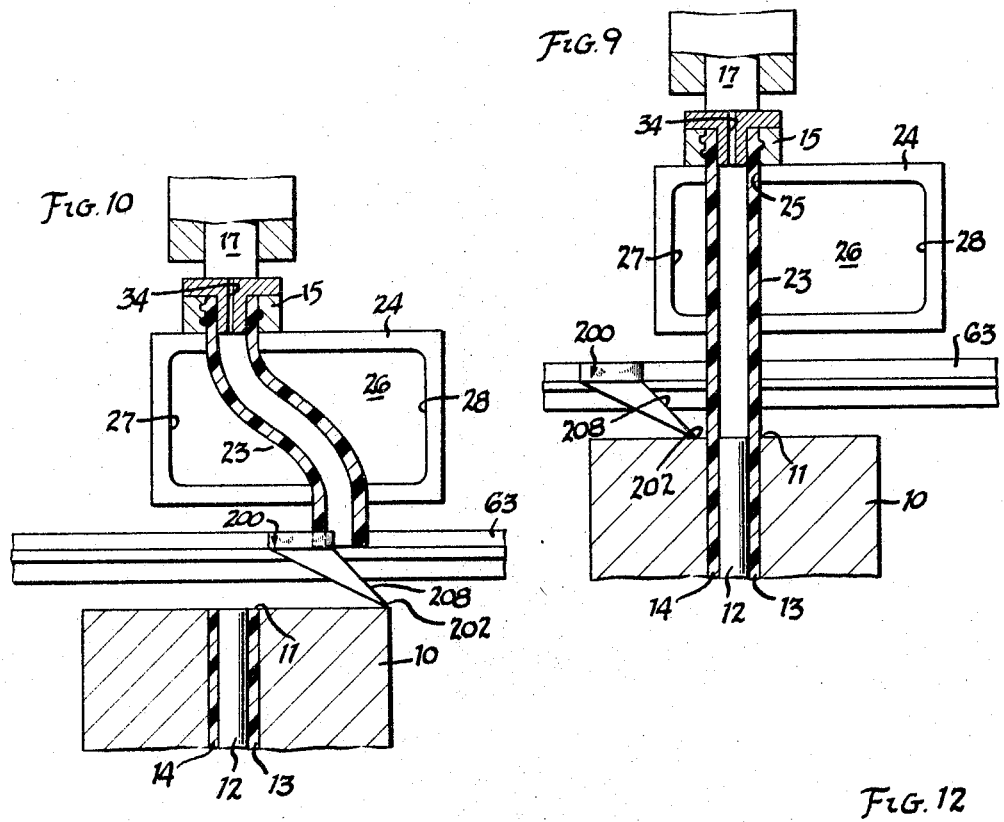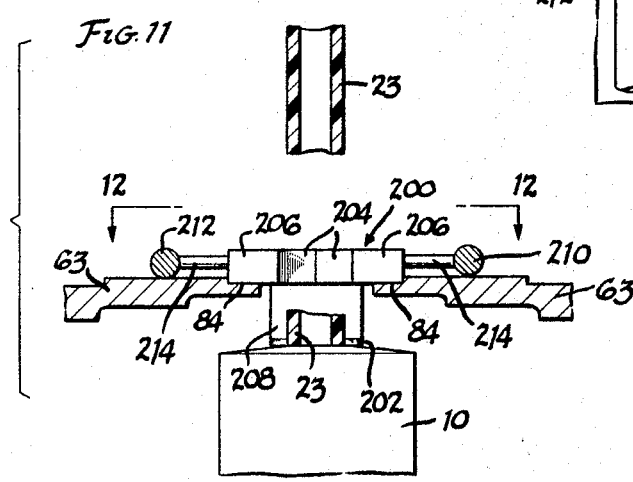

United States Patent Office 3,319,291
Patented May 16, 1967

3,319,291
APPARATUS FOR BLOW MOLDING HOLLOW
PLASTIC CONTAINERS WITH OFFSET FINISH
Wilbur A. Schaich, Maumee, Ohio, assignor to Owens-
Illinois, Inc., a corporation of Ohio
Filed Dec. 16, 1964, Ser. No. 418,601
7 Claims. (Cl. 18—5)

This invention relates generally to apparatus for producing plastic containers, and more particularly to apparatus for manufacturing blown plastic containers, such as bottles, wherein the finish or neck portion is offset axially relative to the body.

Formerly, the manufacture of offset finish ware, such as bottles or containers, by blow molding necessitated the use of a quantity of parison forming plastic considerably greater than the quantity required for comparable ware not having an offset finish. This requirement has been largely due to the fact that the hollow tubular parison was required by the nature of the technique utilized to be eccentrically located with respect to the blow mold cavity at the time of blowing. Thus, in order to provide a sufficient thickness distribution of material in the most remote portions of the mold cavity, an excess thickness of material was accumulated on the portion of the mold cavity nearest to the eccentrically located parison. Hence, because the cost of the plastic forming material generally represents the major part of the total cost of a finished plastic bottle or the like, the expense incurred using prior art techniques of manufacturing offset finish ware has been so great as to be economically prohibitive to many purchasers.

The present invention overcomes the above-described problem of the prior art. It provides apparatus for orienting an extruded hollow tubular parison in a generally non-eccentric relation to the mold cavity by severing the one end of the parison from the extruder and then displacing such severed end so that the parison essentially diagonally bisects the mold cavity into two approximately equal parts immediately prior to blow molding the parison into the mold cavity. In this manner, the amount of parison material required to form a bottle or the like having adequate wall thickness throughout is significantly reduced, since the parison shape conforms more closely to the shape of the final bottle and the various portions of the parison travel, upon blowing, substantially the same distances to the chill mold walls.

Accordingly, it is a primary object of the present invention to provide novel, efficient apparatus for producing offset finish ware, such as bottles or containers with axially offset necks, while significantly reducing the quantity of forming material required to produce adequate wall thickness throughout.

A further object of this invention is the provision of novel, simple apparatus for severing and laterally displacing that end of an extruded tubular parison adjacent the extrusion orifice relative to the blow mold preparatory to blow molding.

Other objects and features of this invention will become apparent from the following description and appended claims in conjunction with the accompanying drawings, wherein:

FIGURE 1 is a schematic side elevational representation, shown partly in cross section, illustrating the initial step of injection molding the neck or finish of a bottle;

FIGURE 2 is a schematic side elevational representation, similar to FIGURE 1, shown partly in cross section, illustrating the step of extruding a tubular parison integral with the injection molded neck;

FIGURE 3 is a similar schematic side elevational representation, shown partly in cross section, illustrating the steps of laterally displacing and severing the proximal end of the parison of FIGURE 1 from the extruder preparatory to blow molding a bottle with an offset finish;

FIGURE 4 is a schematic side elevational representation, shown partly in cross section, illustrating the blown, offset finished bottle confined within the mold which was produced by blow molding the parison of FIGURE 3;

FIGURE 5 is a plan view of the apparatus of the presently preferred embodiment of this invention, the orientation of this apparatus corresponding to that depicted in FIGURE 2;

FIGURE 7 is an additional plan view of the apparatus of FIGURE 5 illustrated in the clamped and offset position which laterally displaces the end of the parison nearer the orifice, the orientation of the apparatus corresponding to that depicted in FIGURE 3;

FIGURE 9 is a schematic side elevational representation of a second presently preferred embodiment of this invention, shown partly in cross section, illustrating an extruded tubular parison having an integral injection molded neck;

FIGURE 10 is a further schematic side elevational representation of the embodiment of FIGURE 9, illustrating the parison in a displaced, essential diagonally bisectual orientation with respect to the blow mold following cutting and displacement of the end of the parison nearer the orifice;

FIGURE 11 is a partial elevational view partly in cross section, illustrating the cutting and displacing tool of FIGURES 9 and 10; and FIGURE 12 is a partial plan view taken along line 12—12 of FIGURE 11.

THE EMBODIMENT OF FIGURES 1-8

Figure 6:
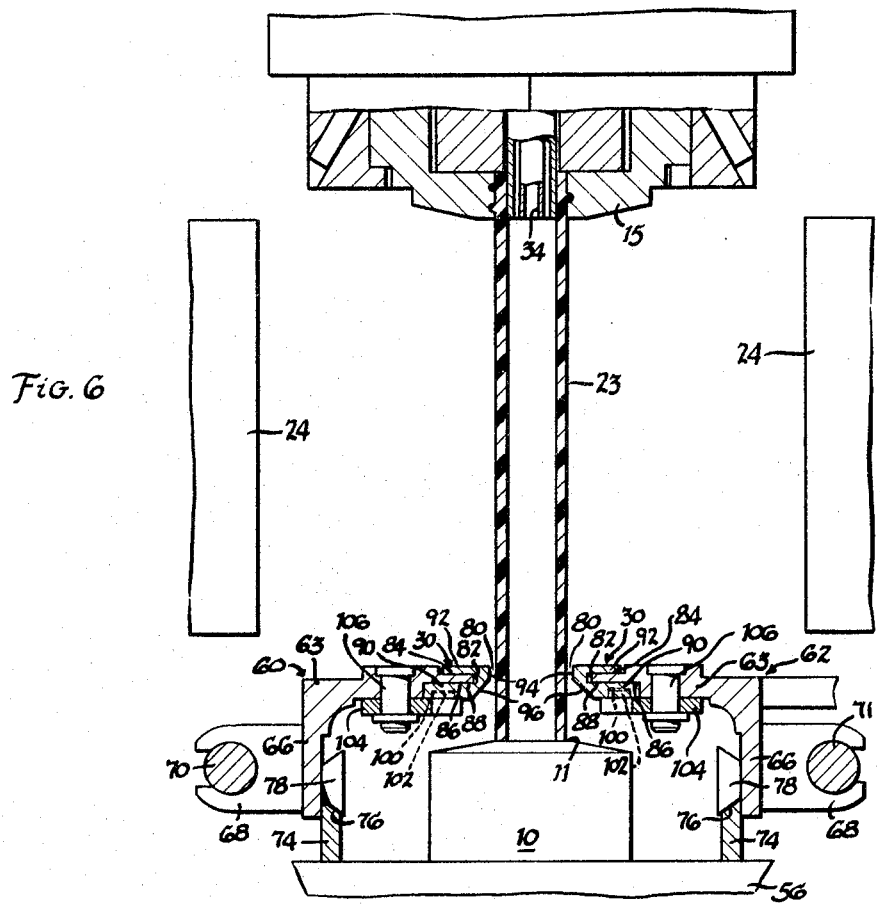
FIGURE 6 is an elevational view shown partly in cross section and taken along line 6—6 of FIGURE 5.

Referring now to the drawings wherein like numerals are used to designate like parts throughout, and more particularly to the schematic representations of FIGURES 1 through 4, which diagrammatically illustrate apparatus and procedural steps for situating a hollow thermoplastic tube or parison diagonally across a cavity of a blow mold section to provide a more even distribution of the plastic material of the parison when the parison is blow molded into the final shape of the offset finish bottle.

The apparatus schematically depicted in FIGURES 1 through 4 comprises an extrusion block 10 provided with an annular orifice 11, such being defined at its inner wall by a mandrel 12 and at its outer wall by the block 10. The mandrel 12 is concentrically positioned in passageway 13 which axially extends upwardly through the block 10. Between the wall of the passageway 13 and the mandrel 12, thermoplastic material 14 flows in tubular form for extrusion through orifice 11. Normally, a plasticizer extruder (not shown) delivers the thermoplastic material 14 to the orifice under suitable pressure.

Above the block 10 is located a conventional neck mold 15 which is reciprocably movable along a vertical path by a rod 16 which is connected to a conventional hydraulic cylinder 17. In its lowermost position the mold 15, as illustrated in FIGURE 1, is in registry with the orifice 11 and in contact with the block 10, such position being accommodated by actuation of cylinder 17 to extend piston rod 16 to the illustrated position.

While the neck mold 15 is situated in its lowermost position as depicted in FIGURE 1, the thermoplastic material 14 is injection molded into the neck mold 15 where it normally chills upon contact with the neck mold and assumes its final shape at that time, while remaining integral with the plastic material 14 in the orifice 11. Upon actuation of cylinder 17 to retract piston rod 16, neck mold 15, along with the injection molded neck of a plastic bottle yet to be formed, moves from the position of FIGURE 1 to the position of FIGURE 2 in timed relation with the extrusion of additional thermoplastic material 14 from orifice 11 to thereby form a hollow elongated tubular parison 23. The upward movement of neck mold 15 and the extrusion of parison at 23 is essentially linear leaving parison 23 oriented at this point in time in a vertical direction. As is customary, the upward travel of the neck mold 15 is terminated at a predetermined point immediately above the uppermost surface of a pair of closable blow mold sections 24, only one of which is illustrated in FIGURES 1 through 4, inclusive, which when closed, define a container cavity 26 wherein the neck portion of the container is substantially offset from the vertical axis of the container. By inspection of FIGURE 2, it is seen that parison 23 extends linearly between neck mold 15 and orifice 11 so as to pass through a neck aperture 25, half of which is formed in each blow mold section 24. In this position, parison 23 is situated adjacent the left one-third of the mold cavity 26. Consequently, if parison 23 were expanded into its finished bottle configuration at this point in time, the near wall 27 of mold cavity 26 would be lined with an excessive wall thickness of plastic while the remote mold cavity walls in the vicinity of numeral 28 would be coated with a much thinner thickness of plastic. Therefore, in order to produce a bottle with adequate wall thickness throughout by such procedure, an excess amount of plastic material would have to be provided in the walls of parison 23 to properly accommodate formation of the bottle with an axially offset finish.

Thus, before the blow mold sections 24 close, a pair of clamping jaws 30, structurally situated above die head 10 and below closable blow mold sections 24, is closed upon the end of the parison 23 immediately adjacent the orifice 11. This operates to locally pinch and seal the bottom end of the parison. After cooperable jaws 30 have been closed upon the parison 23 they are unitarily displaced toward the right as illustrated in FIGURES 1 through 4 in a direction transverse to the longitudinal axis of parison 23 to (1) separate the parison from the thermoplastic material 14 at orifice 11 by a tearing action and (2) relocated the severed lower end 32 of parison 23 preferably immediately beneath the right-hand one-third of mold cavity 26. During the displacement of lower end 32 of parison 23 into the described displaced position, both the neck mold 15, along with its actuating structure, and block 10 remain stationary. As observed by inspection of FIGURE 3, the longitudinal axis of the parison 23 in its desplaced location extends essentially diagonally across mold cavity 26 with respect to its vertical axis and approximately diagonally bisects the cavity. Therefore, the displacement pattern generated when parison 23 is blown is essentially the same in both bisected halves of the mold cavity 26 for purposes of minimizing the volume of plastic necessary in the form of parison 23 to fabricate a bottle with an offset finish having a sufficient and more uniform wall thickness throughout.

At this point in time, the blow mold sections 24 are closed and the offset finished bottle is blown in a conventional manner by inflating parison 23 by a pressurized fluid, such as compressed air, introduced through the nozzle opening 34 of the neck mold 15 to expand the parison into contiguous conformity with the mold cavity 26, as depicted in FIGURE 4. Subsequently, the flash at proximal end 32 is severed from finished bottle 36 in a conventional manner and the finished bottle is suitably cooled and removed from the mold.

The basic machine disclosed in United States Patent 3,008,192, assigned to the assignee of this invention, may be used to form parison 23 in the above-described manner. A modification of the takeout apparatus disclosed in United States Patent 3,060,497, assigned to the assignee of the present inventiin, may be used to function as the closable jaws 30 consistent with the manipulative steps of the foregoing description. This modified apparatus is illustrated in FIGURES 5 through 8 to which reference is now made.

With respect to FIGURES 5 and 6, the orientation of which corresponds to that of the schematic illustration of FIGURE 2, a series of three aligned blocks 10 each having an extrusion orifice 11 are illustrated with a tubular parison 23 extending from each orifice between open serrated jaws 30. Jaws 30 form part of the overall severing and displacement apparatus 50. Each of the three parisons 23 are vertically aligned with respect to neck aperture 25 in oppositely disposed, closable blow mold sections 24 in the manner previously described in conjunction with FIGURES 1 through 4. The three blow mold sections 24 along the right and the three blow mold sections 24 along the left of FIGURE 5 are respectively mounted upon supports 52 and 54, which are in turn actuated between the illustrated open position and a closed, molding position by cylinder assemblies or the like (not shown).

Severing and displacement apparatus 50 is mounted upon a frame 56 of any desirable configuration and materials sufficient to provide the necessary rigidity. Apparatus 50 comprises a bifurcated support 59 which includes support angles 60 and 62, identical but opposite hand, upon which are carried closable jaws 30. Support angles 60 and 62 are integrally connected at end 64 (FIGURE 5).

Depending leg portions 66 of support angles 60 and 62 are integrally connected to outwardly projecting brackets 68, in which piston rods 70 and 71 are integrally attached. Both piston rods 70 and 71 are reciprocably linearly movable responsive to actuation of cylinder assemblies 72 and 73 in the usual manner. Cylinder 72 and 73 may be anchored to the frame 56, as for example by utilization of bolts, to secure them in their illustrated position. Vertically extending rails 74 are integrally connected to frame 56, as for example as by welding, and provide inclined surfaces 76 upon which tapered guide rollers 78, integrally carried by depending leg portions 66, move.

As perhaps best ilustrated in FIGURE 6, a longitudinally extending slot 80 is provided between the bifurcation of support angles 60 and 62. Angles 60 and 62 are open toward the bifurcation at vertical edges 82. Adjacent the edges 82, the upper surface of angles 60 and 62 is recessed at 84 and the bottom surface is recessed at 86. Closeable jaw members 30 are shaped to fit within both recesses 84 and 86 with edges 82 disposed within respective recesses 88 of jaw 30, for both longitudinal and transverse sliding movement along recesses 84 and 86 when the jaws are actuated between the open and closed positions or visa versa. Lower planar portion 90 of each jaw 30 slides along recess 86 while upper planar surface 92 of each jaw 30 slide along recesses 84. Each jaw 30 is provided with a vertical serrated gripping edge 94 joined through lower chamfered surfaces 96 to lower portions 90.

Lower portions 90 of jaw elements 30 are provided with vertical apertures 100, receiving therein upstanding studs 102 formed on or secured to pivot links 104. Pivot links 104 are pivotably connected to the horizontal arms 63 of support angles 60 and 62 by vertically extending pivot pins 106. It will be seen from FIGURE 5 that four such pivot links 104 are provided, the links being movable rotatably about the vertical axis of pivot pins 106 and being connected rotationally, through studs 102 to the jaw elements 30 to affect movement of the jaw elements toward and away from one another.

Thus, the support angles 60 and 62, along with gripping jaws 30, define linkages for transverse movement in parallel planes of the jaws 30 to bring the serrated gripping edges 94 into and out of engagement with the lower end 32 of the parisons 23 thereby pinching the parisons locally adjacent each orifice.

The gripping jaws 30 are reciprocated by suitable power means, such as a fluid pressure actuated cylinder 110, secured to platform 64 FIGURE 5 which integrally connects the support angles 60 and 62 and is displaceable therewith upon actuation of cylinders 72 and 73. The cylinder 110 has its piston rod 112 connected through block 114 to the gripping jaws 30 by means, for example, of upstanding abutments (not shown) formed in or secured to the ends of the gripping jaws 30 and engageable in, for example, a transverse slot (not shown) within block 114 at the undersurface thereof. Thus, upon actuation of cylinder 110 the piston rod 112 will be reciprocated and will reciprocate the gripping jaws 30 regardless of whether they are closed or open.

Figure 8:
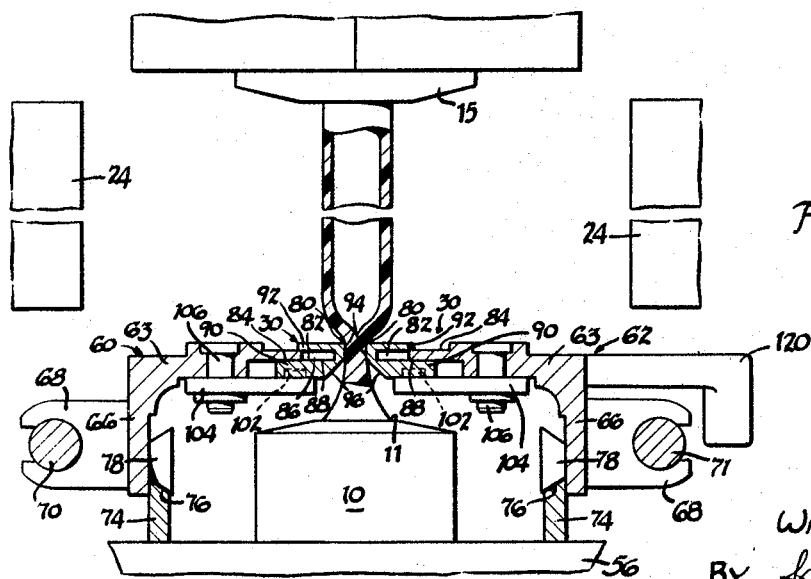
FIGURE 8 is an elevational view, shown partly in cross section and taken along line 8—8 of FIGURE 7.

Because of the pivot links 104, the gripping jaws 30 will be translated arcuately in a direction transverse to the longitudinal axis of the parisons 23 about the axis of pivot pins 106 to move both transversely and longitudinally, pinching the lower ends of parisons 23 between serrated gripping edges 94 when closed. Specifically, retraction of the piston rod 112, as upon the introduction of fluid under pressure into the upper end of the cylinder 110, will cause the gripping jaws 30 to move toward cylinder 110 and the links 104 will cause the serrated edges 94 to move toward one another and into engagement with the lower ends of the three parisons 23 as illustrated in FIGURES 7 and 8, assuming that angle supports 60 and 62 have been extended to overlie the three orifice structures 11. Similarly, actuation of cylinder 110 to extend rod 112, by introduction of fluid under pressure into the lower end of the cylinder 110 moves jaws 30 back into the position illustrated in FIGURES 5 and 6 from the position shown in FIGURES 7 and 8.

For purposes which will become subsequently more apparent, vertically depending leg 66 (FIGURE 8) of angle support 62 has integrally attached thereto, as for example by welding, a stop abutment 120 with which a piston rod 122 of a cylinder 124 engages during the retraction stroke of piston rods 70 and 71 to thereby control the distance which the lower ends 32 of parisons 32 are displaced essentially laterally by the jaws 30 from their respective orifices 11 preparatory to closing of blow mold sections 24 and blowing of the parisons into the final bottle configuration spoken of earlier.

Cylinders 72 and 73 are actuated to extend piston rods 70 and 71 into the position illustrated in FIGURES 5 and 6, either prior to, simultaneously with or subsequent to injection molding of the offset neck in neck mold 15 and extrusion of the parisons 23 from their respective orifices 11. Since piston rods 70 and 71 are integrally connected through brackets 68 to support angles 60 and 62 which in turn carry closable jaws 30, extension of piston rods 70 and 71 into the position of FIGURE 5 jointly extend support angles 60 and 62 as well as closable jaws 30 into the illustrated position immediately above the orifices and below and intermediate of the blow mold sections 24, with jaws 30 opened by a distance sufficient to accommodate travel therethrough by each neck mold 15 and extrusion or extension of each parison 23 therethrough.

When rods 70 and 71, support angles 60 and 62 and jaws 30 reach their illustrated extended position of FIGURES 5 and 6, bracket 68 of piston rod 70 trips limit switch LS1, mounted upon frame 56, signaling that the severing and displacement device 50 is in a state of readiness preparatory to the closing of jaws 30. At this time, cylinder 110 is actuated to retract the formerly extended piston rod 112, from the position of FIGURE 5 to the position of FIGURE 7, which in turn pulls jaws 30 toward cylinder 110 pivoting links 104 about studs 106 to close the jaws about the lower end of the parisons 23. This partially somewhat displaces those lower ends laterally from the orifices 11.

Next, cylinders 72 and 73 are actuated for partial retraction of piston rods 70 and 71 with cylinder 124 being actuated to extend piston rod 122 to engage stop abutment 120 as it is retracted. Tapered rollers 78 turn upon guide rails 74 during the above-described reciprocating motion. This partial retraction of support angle 60 and 62 along with piston rods 70 and 71, while retaining jaws 30 in their closed position will tear the lower end of each parison 23 from its respective orifice 11 and displace the parisons into the position illustrated in FIGURES 3, 7 and 8. Thereafter, blow mold sections 24 are closed upon the diagonally oriented parisons 23 and the parisons are below molded in a conventional manner to form plastic bottles each with an offset finish.

THE EMBODIMENT OF FIGURES 9 THROUGH 12

In the embodiment illustrated in FIGURES 9 through 12 of this invention molding apparatus substantially identical to that described in conjunction with the foregoing embodiment of FIGURES 1 through 8 is shown. Parts of the embodiment of FIGURES 9 through 12 which are identical with the embodiment of FIGURES 1 through 8 are identified by identical numerals, and no further description thereof is deemed necessary or undertaken. Only structural parts which differ from the foregoing embodiment will subsequently be described in detail.

The fundamental difference between the first and second embodiments of this invention is that the closable jaws 30, used to sever and displace the lower end of parisons 23 in the first embodiment, are replaced by three cutting and displacing tools 200.

Here, bifurcated support 59 with support angles 60 and 62 are used, jaws 30 along with studs 102, pivot pins 106 and pivot links 104 being removed therefrom. Bifurcated support 59 may be (1) disconnected from the cylinder 72 and 73 and directly anchored to the frame 56 as by welding or (2) may be retained in connected relation with cylinders 72 and 73, being mounted upon guide rails 74. In the latter case, piston rods 70 and 71 either remain fully extended in a stationary position during operation or else reciprocate for a limited distance between the fully extended position and the partially retracted position, defined by engagement between stop 120 and piston rod 122 as previously described. Thus, for limited reciprocation, the cutting and displacing tools 200 would be integrally attached at both recesses 84 to the horizontally extending arm 63 of the support angles 60 and 62, with tool 200 and angles 60 and 62 reciprocating in timed relation responsive to the operation of cylinders 72 and 73 to cut and displace the parisons.

In the former arrangement, i.e. with support angles 60 and 62 anchored rigidly to the frame 56, the three tools 200 would be slideably mounted in the two recesses 84 for reciprocable cutting and displacing of the parisons. With reference to FIGURES 9 through 12, each tool 200 includes a knife edge 202 which moves along or immediately adjacent to the extrusion surface of its associated orifice 11 to cut transversely across the adjacent parison 23 following its extrusion. Each tool 200 further includes a notch or recess 204 shaped in the form of a V (best illustrated in FIGURE 12), which receives the orifice or lower end of the parison 23 as it is being cut, and displaces the free end of the parison toward the right from the position of FIGURE 9 to the position of FIGURE 10 allowing not only for transverse movement of the orifice or lower end of the cut parison 23 but permitting also a slight measure of upward movement of that end to avoid parison stretch and stress and to provide an adequate length of parison sufficient to extend diagonally across the mold cavity 26 and the provide the necessary distribution of plastic material upon the walls of the cavity 26 during blowing.

Each cutting and displacing tool 200 includes transverse projections 206 which fit in open, upwardly-facing recesses 84 of the horizontal arms 63 of support angles 60 and 62. Each knife edge 202 is connected to both projections 206 and to the structure forming groove 204 by ramp 203. Hence the severed lower end of parison 23 travels up ramp 208 as tool 200 is displaced until recess 204 engages portions of the circumferential periphery of that parison end. Thereafter engagement between the walls of recess 204 and the severed parison end cause the end to be displaced into its fully offset diagonally oriented position illustrated in FIGURE 10 as tool 200 completes its cutting and displacing stroke. The three tools 200 may be interconnected to a pair of rods 210 and 212 by means of tie members 214 (FIGURES 11 and 12), the rods 210 and 212 being integrally attached to the block 114 of FIGURE 5 and actuated by the cylinder 110 and piston 112 (FIGURE 5) of the first embodiment or by comparable means. The timed actuation of cutting and displacing tools 200 responsive to the actuation of cylinder 110 is in the same timed sequence used to manipulate the cylinder 110 to close and open jaws 30 of the first embodiment in the manner described above.

Procedurally during operation, each neck mold 15 is injection molded and each parison 23 extruded in the manner described in conjunction with first embodiment while the three cutting and displacing tools 200 are retained in an adjacent position relative to their associated orifice 11, as depicted in FIGURE 9. When the requisite length of parison 23 has been extruded and each neck mold 15 has been retracted appropriately, cylinder 110 is actuated to retract piston rod 112 which draws each knife edge 202 of each cutting and displacing tool 200 across its associated orifice 11 simultaneously severing and displacing the lower end of the parisons 23 into the position depicted in FIGURE 10. The severed ends of the parisons 23 each move essentially in an arcuate path generally laterally away from the orifice 11 a distance proportional to the distance travelled by tool 200 from its at-rest to its fully displaced position. Thereafter, blow mold sections 24 are closed upon the parisons 23, which are diagonally oriented across mold cavities 26. The closing of the mold sections pinches the severed end of each parison 23, and fluid under pressure is introduced through the nozzles 32 to 34 of neck mold 15 to expand each parison into contiguous conformity with its associated blow mold cavity thus producing a bottle with an offset finish.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In apparatus for producing a bottle having a body and an axially offset neck, an orifice through which a thermoplastic hollow parison is extruded adjacent a blow mold, means for securing the end of the extruded parison remote from the orifice in aligned relation with respect to the orifice, and unitary means for jointly tearing and offsetting the end of the parison adjacent the orifice into diagonal relation across the closable blow mold cavity including a set of jaws closable to laterally grip said last-mentioned parison end so as to locally pinch the parison and a reciprocable support for said set of jaws movable between retracted, extended and partially retracted positions in timed relation with the opening and closing of said set of jaws to jointly tear and displace said end into said diagonal orientation.

2. An apparatus for producing a bottle and the like having a body and an axially offset neck, an orifice through which a thermoplastic tube may be extruded, a neck mold positionable in registry with the orifice and movable axially away therefrom with a length of tube anchored to both the orifice and the neck mold, means for thereafter effecting lateral movement of the end of the tube at the orifice with respect to both the neck mold and the orifice to sever and displace the latter end into a position extending diagonally across a closable blow mold cavity.

3. In apparatus for producing a bottle having a body and an axially offset neck, an orifice through which a thermoplastic hollow parison is extruded, a neck mold positionable in registry with the orifice and movable axially away therefrom while the parison is being extruded so as to be anchored integrally to both the orifice and the neck mold, unitary means for jointly cutting and offsetting the orifice end of the parison into diagonal relation across a closable blow mold cavity including a cutting edge for cutting the parison and a parison-engaging recess adjacent the cutting edge for alignedly displacing the orifice end of the parison into said offset diagonal orientation.

4. In apparatus for producing a bottle having a body and an axially offset finish, an orifice through which a thermoplastic hollow parison is extruded adjacent a blow mold, means for securing the end of the extruded tube in aligned relation with respect to the orifice and unitary means for jointly cutting and displacing the parison from the orifice to diagonally orient the parison with respect to the blow mold cavity, said unitary means having a cutting edge for cutting the parison and a parison-engaging recess adjacent the cutting edge for alignedly displacing the orifice end of the parison into the recited diagonal orientation.

5. In apparatus for producing a bottle having a body and an offset neck, an orifice through which a thermoplastic hollow parison may be extruded, a neck mold positionable in registry with the orifice and movable axially away therefrom while the parison is being extruded so as to be integrally anchored to both the orifice and the neck mold, means for severing and offsetting the orifice end of the parison into diagonal relation across a closable blow mold cavity including a set of jaws closable to laterally grip said end so as to locally pinch the parison and a reciprocable support for said set of jaws movable between retracted, extended and partially retracted positions in timed relation with the opening and closing of said set of jaws to tear and laterally displace said orifice end into said diagonal orientation.

6. In apparatus for producing a bottle having a body and an axially offset neck, an orifice through which a thermoplastic hollow parison is extruded adjacent a blow mold, means for securing the end of the extruded tube remote from the orifice in aligned relation with respect to the orifice, and unitary means for jointly severing and displacing the parison from the orifice to diagonally orient the parison with respect to the blow mold cavity.

7. In an apparatus for producing a bottle having a body and an axially offset finish, an orifice through which a thermoplastic hollow parison is extruded, a neck mold positionable in registry with the orifice and movable axially away therefrom while the parison is being extruded so that the parison is integrally anchored to both the orifice and the neck mold, clamping means for simultaneously tearing and displacing the orifice end of the parison by (1) gripping the orifice end so as to locally pinch the parison (2) separating the orifice end from its integral anchor at the orifice and (3) laterally moving the torn end relative to both the orifice and the neck mold so that the parison is diagonally oriented across a closable blow mold cavity.

References Cited by the Examiner

UNITED STATES PATENTS

| | | | |
|---|---|---|---|
| 3,052,916 | 9/1962 | Campbell | 264—97 |
| 3,106,745 | 10/1963 | King | 264—97 |
| 3,122,596 | 2/1964 | Stenger et al. | 264—98 |

FOREIGN PATENTS 1,130,996  6/1962  Germany.

J. SPENCER OVERHOLSER, *Primary Examiner.*

ROBERT F. WHITE, *Examiner.*

W. L. McBAY, R. B. MOFFITT, *Assistant Examiners.*